(12) United States Patent
Feucht et al.

(10) Patent No.: US 10,464,142 B2
(45) Date of Patent: Nov. 5, 2019

(54) MACHINE TOOL

(71) Applicant: SAUER GmbH, Stipshausen (DE)

(72) Inventors: Florian Feucht, Abtsgmünd (DE); Jens Ketelaer, Wiesbaden (DE)

(73) Assignee: SAUER GmbH, Stipshausen (DE)

( * ) Notice: Subject to any disclaimer, the term of this patent is extended or adjusted under 35 U.S.C. 154(b) by 0 days.

(21) Appl. No.: 15/510,622

(22) PCT Filed: Sep. 11, 2015

(86) PCT No.: PCT/EP2015/070818
§ 371 (c)(1),
(2) Date: Mar. 10, 2017

(87) PCT Pub. No.: WO2016/038183
PCT Pub. Date: Mar. 17, 2016

(65) Prior Publication Data
US 2017/0259353 A1    Sep. 14, 2017

(30) Foreign Application Priority Data

Sep. 11, 2014    (DE) .................... 20 2014 007 224 U (51) Int. Cl.
*B23Q 9/00*    (2006.01)
*B23C 1/20*    (2006.01)
(Continued)

(52) U.S. Cl.
CPC ............... *B23C 1/20* (2013.01); *B23Q 1/015* (2013.01); *B23Q 1/626* (2013.01); *B23Q 9/0014* (2013.01);
(Continued)

(58) Field of Classification Search
CPC .. B23Q 9/0007; B23Q 9/0064; B23Q 9/0071; B23Q 1/34; B23Q 11/0816;
(Continued)

(56) References Cited

U.S. PATENT DOCUMENTS 4,304,133 A * 12/1981 Feamster, III ......... B23Q 1/621
73/633
5,212,391 A * 5/1993 Wachli ............... B23Q 17/2442
250/559.16
(Continued)

FOREIGN PATENT DOCUMENTS

CN    1135950 A    11/1996
CN    1359320 A    7/2002
(Continued)

OTHER PUBLICATIONS

Machine translation, German patent document, DE102005058493 (A1), Rieder et al., Jun. 6, 2007.*
(Continued)

*Primary Examiner* — Sunil K Singh
*Assistant Examiner* — Chwen-Wei Su
(74) *Attorney, Agent, or Firm* — Christensen O'Connor Johnson Kindness PLLC (57) ABSTRACT

A machine tool includes a frame with two opposite frame sections, a number of leg elements arranged on the frame, and a first carriage having a first linear axis. The first carriage is guided on the two opposite sections of the frame and is displaceable in a first direction. A second carriage of a second linear axis is guided on the first carriage and is displaceable in a second direction A tower element has a third linear axis, which is retained on the second carriage. A machining element is retained on the tower element and is displaceable in a third direction, and a tool spindle is arranged on the machining element for receiving a tool.

21 Claims, 9 Drawing Sheets

(51) Int. Cl.
  *B23Q 1/01* (2006.01)
  *B23Q 1/62* (2006.01)
  *B23Q 11/00* (2006.01)
  *B23Q 11/08* (2006.01)
  *B23Q 17/24* (2006.01)

(52) U.S. Cl.
  CPC ...... *B23Q 11/0046* (2013.01); *B23Q 11/0071* (2013.01); *B23Q 11/085* (2013.01); *B23Q 17/2404* (2013.01); *B23Q 17/2409* (2013.01); *B23Q 17/2428* (2013.01); *B23C 2230/08* (2013.01); *B23C 2260/56* (2013.01); *B23Q 9/0007* (2013.01); *B23Q 9/0071* (2013.01); *B23Q 11/0816* (2013.01); *Y10T 409/304088* (2015.01); *Y10T 409/306384* (2015.01); *Y10T 409/309576* (2015.01)

(58) Field of Classification Search
  CPC . Y10T 409/306384; Y10T 409/309576; Y10T 409/304088
  See application file for complete search history.

(56) References Cited

U.S. PATENT DOCUMENTS

| | | | |
|---|---|---|---|
| 5,351,626 A * | 10/1994 | Yanagisawa | B62D 57/032 180/164 |
| 5,468,099 A * | 11/1995 | Wheetley | B23B 39/04 180/8.1 |
| 6,550,129 B1 | 4/2003 | Buttrick, Jr. | |
| 6,926,094 B2 * | 8/2005 | Arntson | B23B 39/18 173/31 |
| 7,172,375 B2 * | 2/2007 | Tanoue | B23Q 1/012 409/202 |
| 7,226,403 B2 * | 6/2007 | Konvicka | B23Q 1/012 198/346.1 |
| 7,264,426 B2 | 9/2007 | Buttrick, Jr. | |
| 7,665,200 B1 * | 2/2010 | Shimooka | B23Q 1/626 29/560 |
| 8,235,773 B2 * | 8/2012 | Yin | B23Q 11/0046 451/451 |
| 2002/0003352 A1 * | 1/2002 | Portal | B23Q 1/5462 279/3 |
| 2004/0265081 A1 | 12/2004 | Buttrick, Jr. | |
| 2005/0263950 A1 * | 12/2005 | Hamann | B25B 11/005 269/266 |
| 2009/0053004 A1 * | 2/2009 | Yamaura | B23Q 1/623 409/165 |
| 2009/0162160 A1 * | 6/2009 | Lechleiter | B23Q 1/0027 409/201 |
| 2010/0115749 A1 * | 5/2010 | Torres Martinez | B23Q 5/50 29/33 R |
| 2012/0107062 A1 | 5/2012 | Moraru et al. | |
| 2014/0037397 A1 * | 2/2014 | Tanaka | B23Q 1/70 409/235 |

FOREIGN PATENT DOCUMENTS

| | | | |
|---|---|---|---|
| CN | 101491843 A | 7/2009 | |
| CN | 102528567 A | 7/2012 | |
| CN | 102699768 A | 10/2012 | |
| DE | 36 17 326 A1 | 11/1987 | |
| DE | 93 18 014 U1 | 2/1994 | |
| DE | 197 03 078 A1 | 5/1998 | |
| DE | 199 48 822 A1 | 4/2001 | |
| DE | 699 14 377 T2 | 11/2004 | |
| DE | 20 2004 016 057 U1 | 2/2006 | |
| DE | 102004047525 A1 | 4/2006 | |
| DE | 102005058493 A1 * | 6/2007 | B21J 15/14 |
| DE | 60 2006 000 044 T2 | 4/2008 | |
| DE | 102012023619 A1 | 6/2014 | |
| DE | 10 2014 102 377 A1 | 8/2014 | |
| EP | 1792673 A2 | 6/2007 | |
| EP | 2529879 A1 | 12/2012 | |
| JP | 2001322048 A * | 11/2001 | |
| JP | 2011020225 A * | 2/2011 | B23B 39/14 |
| WO | 2010/147733 A1 | 12/2010 | |
| WO | 2014/086621 A1 | 6/2014 | |

OTHER PUBLICATIONS

Written Opinion of the International Searching Authority dated Feb. 24, 2016, issued in corresponding International Application No. PCT/EP2015/070818, filed Sep. 11, 2015, 7 pages.
International Preliminary Report on Patentability dated Mar. 14, 2017, issued in corresponding International Application No. PCT/EP2015/070818, filed Sep. 11, 2015, 1 page.
German Search Report dated Jun. 19, 2015, issued in corresponding German Application No. 20 2014 007 224.8, filed Sep. 11, 2014, 6 pages.
International Search Report dated Feb. 24, 2016, issued in corresponding International Application No. PCT/EP2015/070818, filed Sep. 11, 2015, 10 pages.
Chinese Office Action dated Aug. 27, 2018, issued in corresponding Chinese Application No. 201580048786.7, filed Mar. 10, 2017, with English Translation Summary, 14 pages.

* cited by examiner

MACHINE TOOL

The present invention relates to a machine tool or preferably to a mobile machine tool or mobile milling machine for machining workpieces, in particular for machining surfaces of large workpieces or composite components. The present international patent application claims the priority of the German utility model DE 20 2014 007 224.8, filed on Sep. 11, 2014.

BACKGROUND OF THE INVENTION

A generic mobile machine tool, which is proposed for a method of repairing the surfaces of composite components, is known from WO 2010/147733 A1. The generic mobile machine tool comprises a substantially rectangular frame having a plurality of support legs attached to the frame with which the mobile machine tool can be disposed or mounted on a surface of a workpiece.

A machining head of the generic mobile machine tool comprises a tool spindle with a tool holder for receiving and driving a tool (e.g., milling, drilling, etc.), wherein the machining head is displaceable by three linear axes X, Y and Z in orthogonal X, Y and Z directions building upon each other. Here, the frame comprises two opposite frame sections on which guiding means of the X axis are arranged.

Starting from the aforementioned generic mobile machine tool, it is an object of the invention to provide a machine tool for mobile use which improves machining accuracy, while it offers a wider range of applications, at increased practicality, in particular for automated repair of large composite components or fibre reinforced plastic components such as in the aerospace and automotive industries.

To achieve the above mentioned object, a machine tool, in particular a mobile machine tool, is proposed in accordance with claim 1 or the independent claims. Dependent claims relate to preferred embodiments of the invention.

SUMMARY OF THE INVENTION

According to a first aspect of the invention, a machine tool is proposed, comprising: a frame with two opposite frame sections, a plurality of leg elements arranged on the frame, a first carriage which has a first linear axis, is guided on the two opposite sections of the frame and is displaceable in a direction X, a second carriage which has a second linear axis, is guided on the first carriage and is displaceable in a direction Y, a tower element which has a third linear axis and is retained on the second carriage, a machining element which is retained on the tower element and is displaceable (directly or indirectly) in a direction Z, and a tool spindle arranged on the machining element for receiving a tool; the frame having a monolithic frame element which is made of a fibre reinforced plastic, especially a carbon-fibre reinforced plastic, and which comprises the two opposite frame sections.

In particular, this has the advantage that the frame of the machine tool may be provided with a very low weight and therefore the entire machine may be provided with a very low total weight, so that a mobile machine tool according to this aspect can be carried or moved manually by a few operators.

For example, with such a structure it is possible, given frame dimensions from 0.5 to 1.5 meters in length and width, to provide mobile machine tools with a reduced total weight, in particular less than 100 kg, which can be carried or moved manually by two or three operators and can be manually disposed or mounted on a large-scale component.

Moreover, in addition to the very advantageous weight reduction the structure of the frame according to the invention provides, by means of a monolithic frame element made of a fibre reinforced plastic, the further advantage, that, compared to the frame made of metallic materials and possibly with multi-part structure of the frame like in the prior art, an outstanding stiffness of the frame may be achieved so that a significantly improved machining accuracy may be achieved in the machine tool according to the invention.

The combination of the above advantages advantageously allows the use of the mobile machine tool for the automated repair of large composite components or fibre reinforced plastic components such as in the aerospace and automotive industries.

According to a preferred exemplary embodiment, the machine tool further comprises a first rotational axis, which is configured to rotate the machining element about a first axis of rotation, and/or a second rotational axis, which is configured to rotate the machining element about a second axis of rotation arranged transversely or perpendicularly to the first axis of rotation.

This offers the advantage that the machining options, control options and possible applications of the machine tool may be significantly increased, since, in addition to the structure with three linear axes having three linear degrees of freedom of the control of the tool in the spindle at the machining element relative to a surface of a workpiece well-known from the prior art according to WO 2010/147733 A1, two more rotational degrees of freedom may be provided, so that a movement control is provided with all five spatial degrees of freedom possible is provided.

For measuring the surface of the workpiece and for determining the machine tool position and orientation of the machine tool relative to the workpiece, the mobile machine tool preferably comprises a laser measuring device. In addition, the mobile machine tool may, for example, comprise one or more cameras for the visual inspection of the surface of the workpiece and/or for watching the machining space, which, for example, is formed by the frame or the interior of the frame.

According to a preferred exemplary embodiment, guiding means for guiding the first carriage of the first linear axis are mounted and/or fixed directly on the monolithic frame element. This makes it possible to improve the stiffness of the kinematics of the machine tool further, and in addition the overall weight of the machine can be further reduced, since the number of components is reduced.

According to a preferred exemplary embodiment, the first carriage has two opposite cross members, which preferably extend from one of the two opposite frame sections to the other of the two opposite frame sections of the frame, wherein guiding means for guiding the second carriage of the second linear axis are preferably arranged on the two opposite cross members of the first carriage.

According to a preferred exemplary embodiment, the guiding means for guiding the second carriage of the second linear axis are arranged on the two opposite cross members of the first carriage on the side of the first carriage, on which the first carriage is guided on the two opposite frame sections of the frame, such that the second carriage and the frame of the machine tool are arranged on the same side of the first carriage.

This has the advantage that the overall height of the machine tool may be reduced and the manual mobility of the machine tool is improved. In addition, the tool may be mounted better and more safely also on inclined surfaces, as a total torque acting on the machine tool due to the weight of the machine tool in case of an inclination is lower by virtue of the lower centre of gravity of the machine tool.

According to a preferred exemplary embodiment, the first carriage has a monolithic frame element made of a fibre reinforced plastic, in particular a carbon-fibre reinforced plastic. This has the advantage that the total weight of the machine tool can be further reduced and the rigidity of the machine body may be further improved so that still higher machining accuracies may be achieved.

According to a preferred exemplary embodiment, the monolithic frame element of the first carriage comprises the two opposite cross members of the first carriage. This has the advantage that the stiffness of the structure is further improved so that still higher machining accuracies may be achieved.

According to a preferred exemplary embodiment, the guiding means for guiding the second carriage of the second linear axis are mounted directly and/or fixed on the two opposite cross members of the first carriage. This makes it possible to improve the stiffness of the kinematics of the machine tool further, and in addition the total weight of the machine may be further reduced, since the number of components is reduced.

According to a preferred exemplary embodiment, the tower element is arranged between the two opposite cross members of the first carriage. This has the advantage that even higher machining accuracies may be achieved in the machine tool because the weight of the tower element and oppositely acting forces due to machining the workpiece act symmetrically on the first carriage and thus no torque acts on the first carriage.

According to a preferred exemplary embodiment, the second carriage includes a monolithic frame element made of a fibre reinforced plastic, in particular a carbon-fibre reinforced plastic. This has the advantage that the total weight of the machine tool may be further reduced and the stiffness of the machine body may be further improved so that still higher machining accuracies may be achieved.

According to a preferred exemplary embodiment, the second carriage includes two opposite cross members, wherein the tower element is preferably arranged between the two opposite cross members of the second carriage. This has the advantage that even higher machining accuracies of the machine tool can be achieved because the weight of the tower element and oppositely acting forces due to machining the workpiece act symmetrically on the first carriage, and thus no torque acts on the first carriage.

According to a preferred exemplary embodiment, the monolithic frame element of the second carriage comprises the two opposite cross members of the second carriage. This has the advantage that the stiffness of the structure is further improved so that still higher machining accuracies can be achieved.

According to a preferred exemplary embodiment, the tower element is supported rotatably on the second carriage and a direct drive of the first rotation axis is preferably arranged on the second carriage, which drives the tower element rotationally. This has the advantage that the overall height of the machine tool can be further reduced and also that the centre of gravity of the rotational axes is closer to the second carriage. Thus, in case the machine is inclined, the acting torques can be reduced. Thereby, a further improved machining accuracy can be achieved.

According to a preferred exemplary embodiment, the machining element includes an actuator which is configured to drive a vibratory movement of a tool held on the tool spindle in the direction of the spindle axis, in particular preferably at a frequency in the ultrasonic range. This has the advantage that the machining accuracy can be further improved. Particularly when surfaces of composite components and components made of fibre reinforced plastic are machined, the machined surface exhibits a significantly reduced fraying or a fraying on the surface of composite components or components made of fibre reinforced plastic can be avoided.

According to a preferred exemplary embodiment, the actuator includes a piezoelectric drive which is configured to drive the vibratory movement of a tool held on the tool spindle in the direction of the spindle axis, in particular at a frequency in the ultrasonic range.

According to a preferred exemplary embodiment, the machine tool further comprises a suction means for extracting dust and machining chips from a machining space arranged in the interior of the frame, wherein the frame preferably comprises one or more suction openings, which face the interior of the frame. This has the advantage that no additional devices have to be provided to remove chips and dust from the machining space.

Furthermore, the suction openings may advantageously be formed compactly in the frame element so that the machining space is not further limited in space by additional suction openings or suction tubes so that a movability of the machining element remains unrestricted throughout the interior of the frame.

According to a preferred exemplary embodiment, the machine tool further comprises one or more suction ducts, which are preferably connected to the one or more suction openings, and which are preferably formed on or in the monolithic frame element. This has the advantage that the suction ducts can be formed compactly and at a low weight on or in the frame element, wherein in addition also the stiffness of the frame can be further increased, so that the machining accuracy can also be improved.

According to a preferred exemplary embodiment, at least one suction port, which is connected to the suction ducts, for connecting an external suction device is mounted or formed on the monolithic frame element. This has the advantage that an external suction device can be connected to the monolithic frame element, preferably on side facing away from the machining space, so that the machining space is not limited in space by additional suction devices or suction tubes so that a mobility of the machining element remains unrestricted throughout the interior the frame.

According to a preferred exemplary embodiment, the two opposite frame sections of the frame include guides for one or more roller cover elements movable in the X-direction for covering the interior of the frame. This has the advantage that the machining space can be covered above with simple means. This allows both to protect the operator from inserting something and to seal the machining space. In addition, the efficiency of a suction device for the machining space can be improved.

According to a preferred exemplary embodiment, the movable roller cover elements are formed of transparent material. This has the advantage that the machining space continues to be visible from above.

According to a preferred exemplary embodiment, end portions of the movable roller cover elements are mounted on the first carriage such that displacing the first carriage moves the movable roller cover elements. This has the advantage that the movement of the first carriage is not restricted, and that the movement of the roller cover elements follows the movement of the first carriage.

According to a preferred exemplary embodiment, the plurality of leg elements arranged on the frame includes a respective suction cup connection for attachment to the surface of a workpiece to be machined. This allows a simpler and more reliable releasable attachment of the leg elements to a surface of a workpiece.

According to a preferred exemplary embodiment, the plurality of leg elements arranged on the frame include a respective hollow element which, at one end, is connected to the respective suction cup connection and/or, at another end, is connected to a medium port. This has the advantage that a vacuum can be applied in order to attach and mount the suction ports reliably on the surface of a workpiece.

According to a preferred exemplary embodiment, one or more of the plurality of leg elements arranged on the frame include a respective ball joint. This has the advantage that the suction ports may each be independently pivoted on the leg elements, in order to be better adaptable to an uneven surface of a workpiece.

According to a preferred exemplary embodiment, the hollow element comprises the ball joint, the ball element of the ball joint preferably including a duct for passing through media. This has the advantage that a vacuum can be applied via the ball joint, in order to reliably attach and mount the suction ports to the surface of a workpiece.

According to a preferred exemplary embodiment, the plurality of leg elements arranged on the frame are adjustable in height. This has the advantage that the height of the suction ports at the leg elements can each be varied independently in order to be better adaptable to an uneven surface of a workpiece.

According to a preferred exemplary embodiment, the machine tool further comprises a control interface for connecting an external control device for controlling the machine tool.

According to a preferred exemplary embodiment, the control interface is arranged on the frame, and preferably includes an external power interface for supplying the machine with electrical power and/or an external communication interface for receiving external control signals from the external control device.

According to a preferred exemplary embodiment, the machine tool further comprises one or more drive controllers for controlling a respective drive of a controllable axis of the machine tool, each of said drive controllers preferably being connected to the communication interface of the control interface. This has the advantage that a decentralized control configuration is possible in which a single external connection (such as a bus cable) is sufficient to control all of the drive controllers, since the connections to the drive controllers branch out only from the control interface. This allows additional weight and space savings.

According to a preferred exemplary embodiment, each of the drive controllers is connected to the power interface of the control interface. This has the advantage that a single external connection (such as a power cable) is sufficient to supply all the drive controllers electrically, since the connections to the drive controllers branch out only from the control interface. This allows additional weight and space savings.

According to a preferred exemplary embodiment, the machine tool further comprises one or more drives for driving a respective controllable axis of the machine tool, each of the drives preferably being connected to the power interface of the control interface. This has the advantage that a single external connection (such as a power cable) is sufficient to supply all of the drives electrically, since the connections to the drives branch out only from the control interface. This allows additional weight and space savings.

According to a preferred exemplary embodiment, one or more cable guiding ducts are formed on or in the monolithic frame element of the frame. This creates a more efficient and simpler structure in which fewer cables are routed openly. In addition, the stiffness of the frame element is advantageously increased.

According to a preferred exemplary embodiment, the machine tool further comprises a cover element which is arranged at the first carriage and covers the first carriage. According to a preferred exemplary embodiment, the cover element covers the second carriage arranged on the first carriage and/or the tower element. This has the advantage that an insertion protection is provided for the operator. Furthermore, the moving parts of the machine tool are protected from outside interference.

The above preferred aspects or the features thereof may be provided individually and in combination. Furthermore, independent aspects are described below, which can be provided independently and in combination with all the above aspects.

According to a further independent aspect, a machine tool is proposed, comprising: a frame with two opposite frame sections, a plurality of leg elements arranged on the frame, a first carriage which has a first linear axis, is guided on the two opposite sections of the frame and is displaceable in a direction X, a second carriage which has a second linear axis, is guided on the first carriage and is displaceable in a direction Y, a tower element which has a third linear axis and is retained on the second carriage, a machining element which is directly or indirectly retained on the tower element and is displaceable in a direction Z, and/or a tool spindle arranged on the machining element for receiving a tool, wherein the machining element comprises an actuator which is configured to drive a vibratory movement of a tool held on the tool spindle in the direction of the spindle axis, in particular at a frequency in the ultrasonic range.

According to a further independent aspect, a machine tool is proposed, comprising: a frame with two opposite frame sections, a plurality of leg elements arranged on the frame, a first carriage which has a first linear axis, is guided on the two opposite sections of the frame and is displaceable in a direction X, a second carriage which has a second linear axis, is guided on the first carriage and is displaceable in a direction Y, a tower element which has a third linear axis and is retained on the second carriage, a machining element which is directly or indirectly retained on the tower element and is displaceable in a direction Z, a tool spindle arranged on the machining element for receiving a tool, and/or a suction means for extracting dust and machining chips from a machining space arranged in the interior of the frame, wherein the frame comprises one or more suction openings, which face the interior of the frame.

According to a further independent aspect, a machine tool is proposed, comprising: a frame with two opposite frame sections, a plurality of leg elements arranged on the frame, a first carriage which has a first linear axis, is guided on the two opposite sections of the frame and is displaceable in a direction X, a second carriage which has a second linear axis, is guided on the first carriage and is displaceable in a direction Y, a tower element which has a third linear axis and is retained on the second carriage, a machining element which is directly or indirectly retained on the tower element and is displaceable in a direction Z, a tool spindle arranged on the machining element for receiving a tool, and/or one or more roller cover elements movable in the X-direction for covering the interior of the frame, the two opposite frame sections of the frame including guides for the roller cover elements.

According to a further independent aspect, a machine tool is proposed, comprising: a frame with two opposite frame sections, a plurality of leg elements arranged on the frame, a first carriage which has a first linear axis, is guided on the two opposite sections of the frame and is displaceable in a direction X, a second carriage which has a second linear axis, is guided on the first carriage and is displaceable in a direction Y, a tower element which has a third linear axis and is retained on the second carriage, a machining element which is directly or indirectly retained on the tower element and is displaceable in a direction Z, a tool spindle arranged on the machining element for receiving a tool, and/or a control interface for connecting an external control device for controlling the machine tool, wherein the control interface is arranged on the frame, and includes an external power interface for supplying the machine with electrical power and/or an external communication interface for receiving external control signals from the external control device, and/or wherein the machine tool further comprises one or more drive controllers for controlling a respective drive of a controllable axis of the machine tool, each of said drive controllers being connected to the communication interface and the power interface of the control interface.

In further preferred embodiments, at one of the machine tools described above, one or more video recording devices may be arranged at the frame of the machine tool (for example, the above-mentioned camera for the visual inspection of the surface of the workpiece, which may optionally be attached to the machining unit, and/r one or more cameras, for example on the frame of the machining element, for monitoring a portion of the machining space or the entire machining space, which is formed inside the frame element).

Preferably, the one or more video recording devices each comprise one or more fixed cameras, which are preferably directed to the machining element and/or preferably at least directed to a portion of a machining space formed by the frame of the machine tool. This advantageously enables an operator to monitor the machining in the machining space of the machine tool, possibly via an external display of a display device which may be connected to the video recording device(s) via a cable connection and/or via a wireless communication link.

Alternatively or additionally, the one or more video recording devices preferably each include one or more controllable cameras, which are preferably directable towards the machining element and/or at least towards a portion of a machining space formed by the frame of the machine tool. This advantageously enables an operator to monitor the machining in the machining space of the machine tool, possibly via an external display of a display device which may be connected to the video recording device(s) via a cable connection and/or via a wireless communication link, and to control the orientation of the cameras movably or optionally (or alternatively, for example, in the above-mentioned fixed cameras) also to control a zoom level electronically.

Preferably, the one or more video recording devices are connected by means of a power and/or signal line to a power and/or control interface of the machine tool, via which the video recording devices are preferably connectable to an external display device to output video signals, preferably for displaying video images on a display of the external display device, and/or are connectable to a control device, via which an operator of the machine tool can control the one or more video recording devices.

The above embodiments with video recording devices are particularly useful in a configuration as a mobile machine tool, since the machine tool is then optionally disposed on or at larger installation surfaces, that are possibly difficult to be viewed directly as a result of the height at which the machine tool is located (for example, if a mobile machine tool is employed at wings of a large aircraft), since the operator can still view the machining space or portions thereof via the signals from the video recording devices, for example via a fixed or mobile display device (such as a tablet, a laptop, a smartphone or via a display of an externally connected control panel).

In further preferred embodiments, in one of the machine tools described above, one or more electric light sources may be formed, in particular as LED units with a plurality of LEDs and/or as a flood light, preferably for illuminating a machining space formed by the frame of the machine tool. This has the advantage that the process or machining monitoring (possibly with the aforementioned video recording devices) remains possible even in low light conditions or can be significantly improved.

In summary, in accordance with aspects and preferred embodiments of the invention, machine tools are proposed that may advantageously be used in mobile applications at significant weight saving, wherein the stiffness of the machine can be increased and the machining accuracy can be improved at enhanced practicality and with a wider possible range of applications.

The foregoing aspects advantageously enable the use of the mobile machine tool for automated repair of large composite components or fibre reinforced plastic components such as in the aerospace and automotive industries.

The invention is described hereinafter by way of example with reference to the accompanying schematic drawings.

DETAILED DESCRIPTION OF THE FIGURES AND THE PREFERRED EMBODIMENTS

In the following, examples of the present invention will be described in detail with reference to the figures. Herein, like elements are designated with the same reference signs in the figures. However, the present invention is not limited to the features of the embodiments described, but also includes modifications of features of the embodiments described and combinations of features of various examples within the scope of the independent claims.

Figure 1:
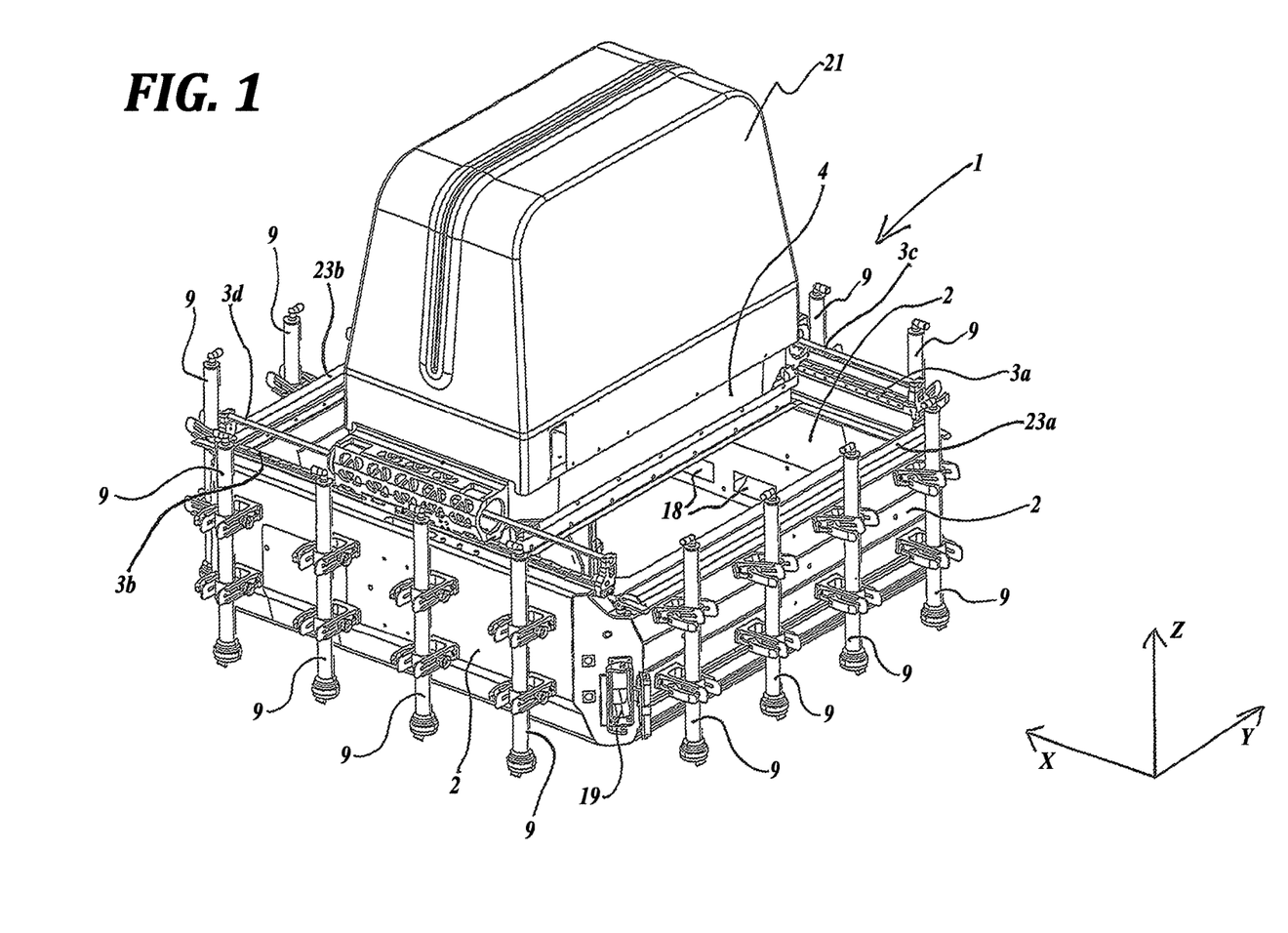
FIG. 1 is a schematic perspective view of a machine tool according to an embodiment of the present invention, viewed obliquely from above.
Figure 2:
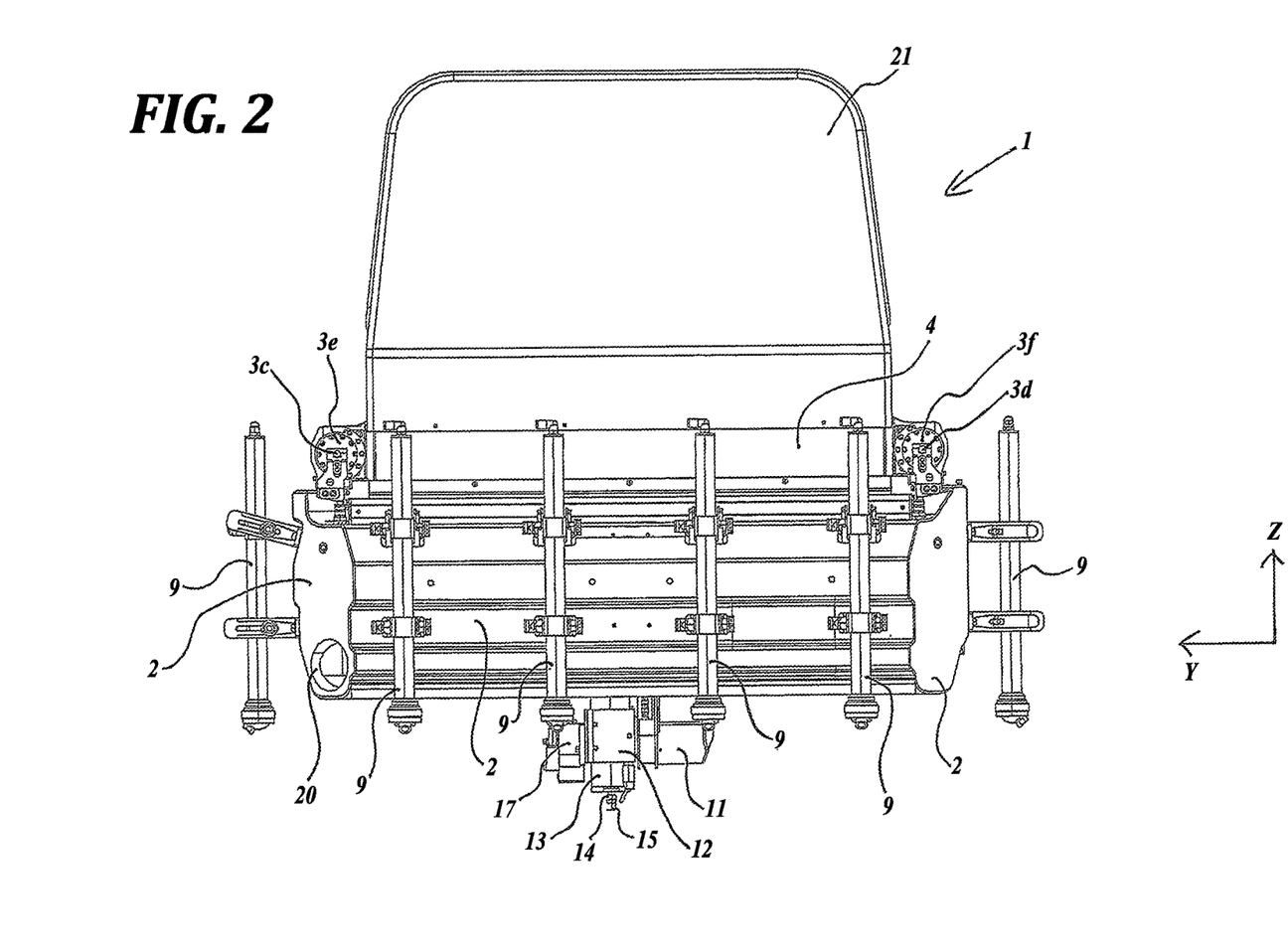
FIG. 2 is a schematic front view of the machine tool according to an embodiment of the present invention.
Figure 3:
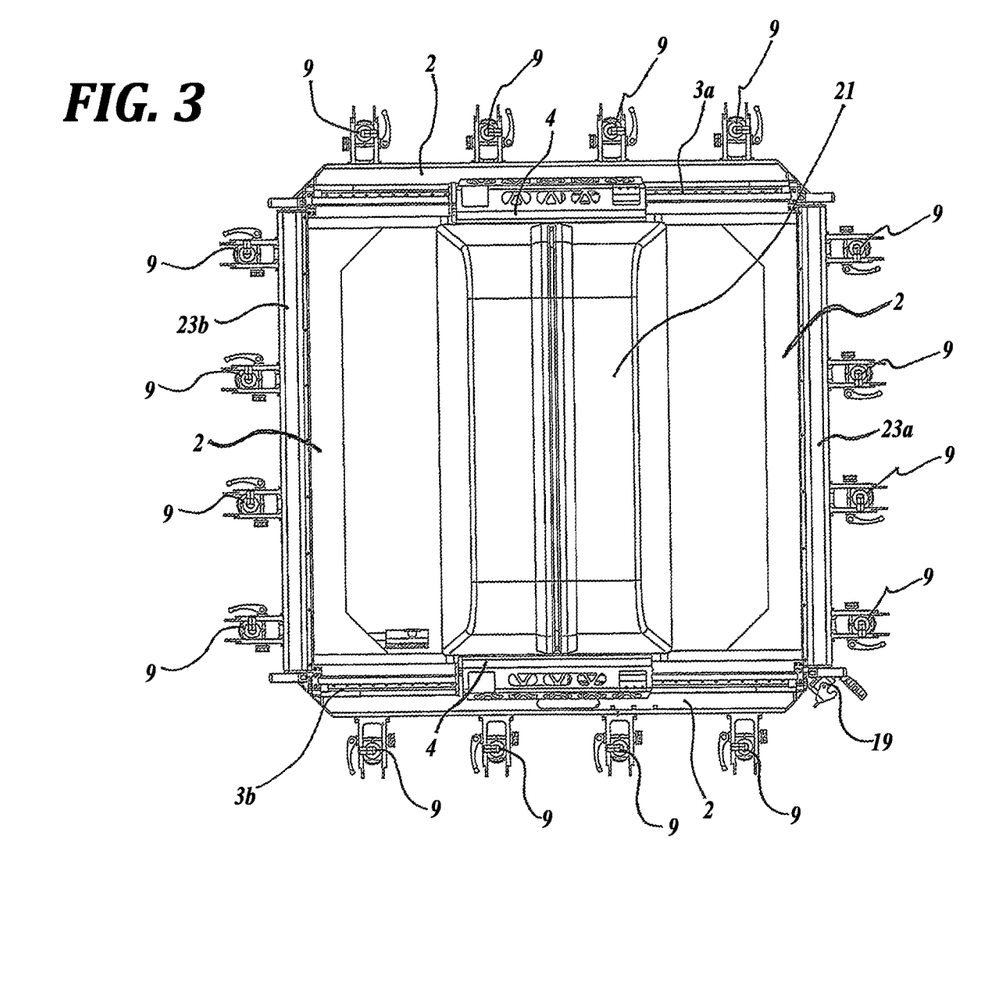
FIG. 3 is a schematic plan view of the machine tool according to an embodiment of the present invention.
Figure 4:
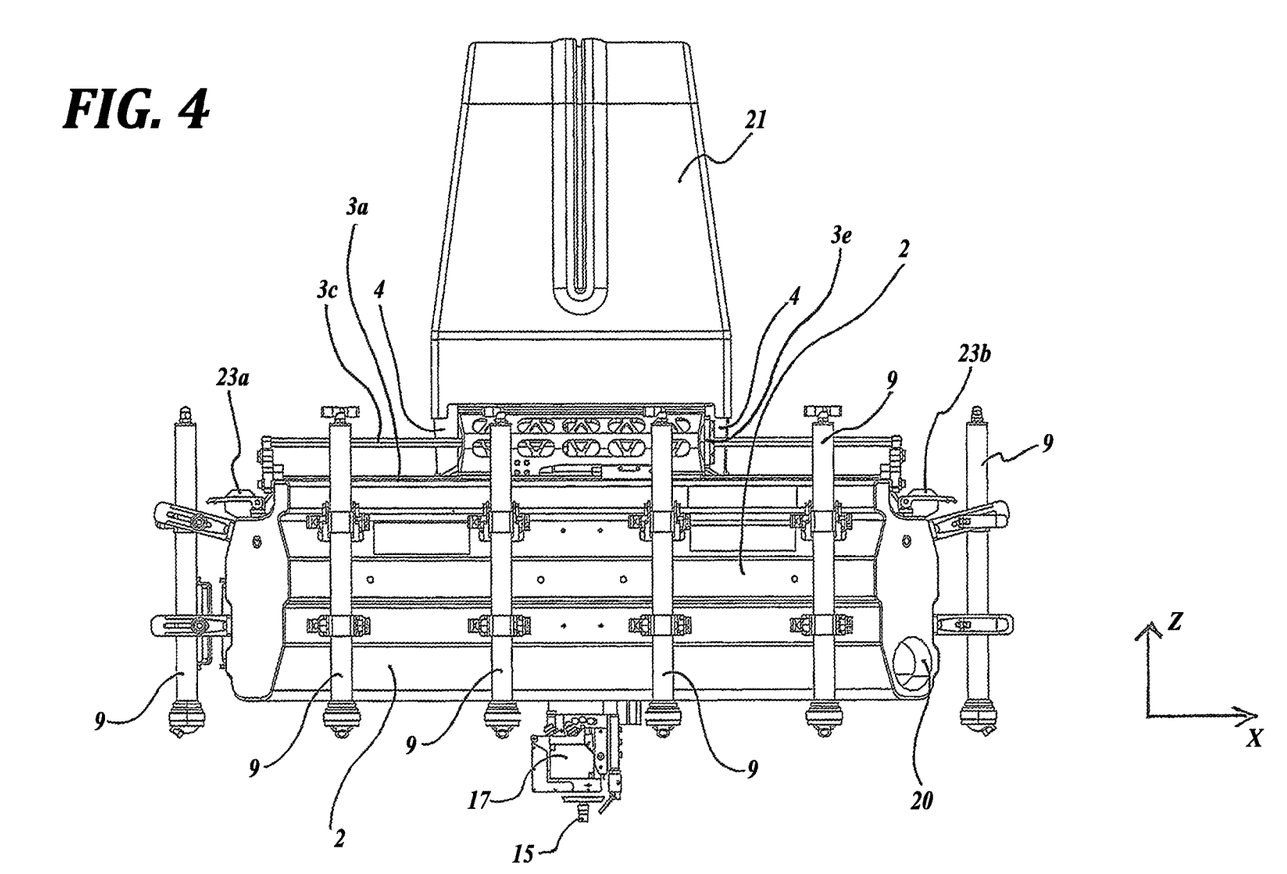
FIG. 4 is a schematic side view of the machine tool according to an embodiment of the present invention.

FIGS. 1 to 8 show schematic views of a mobile machine tool 1 according to an embodiment of the present invention. FIG. 1 shows a schematic perspective view of the machine tool 1 according to the embodiment of the present invention, viewed obliquely from above, FIG. 2 shows a schematic front view of the machine tool 1, FIG. 3 shows a schematic plan view of the machine tool 1 and FIG. 4 shows a schematic side view of the machine tool 1, As a base frame, the machine tool 1 includes, for example, a rectangular or substantially square-shaped frame which is an example of a monolithically formed frame element 2 made of a fibre reinforced plastic, in particular a carbon fibre reinforced plastic, on which, optionally in exemplary embodiments, additional elements such as attached cover plates or the like may be mounted. Preferably, the frame width and/or the frame length are about 0.5 to 1.5 m.

Figure 5:
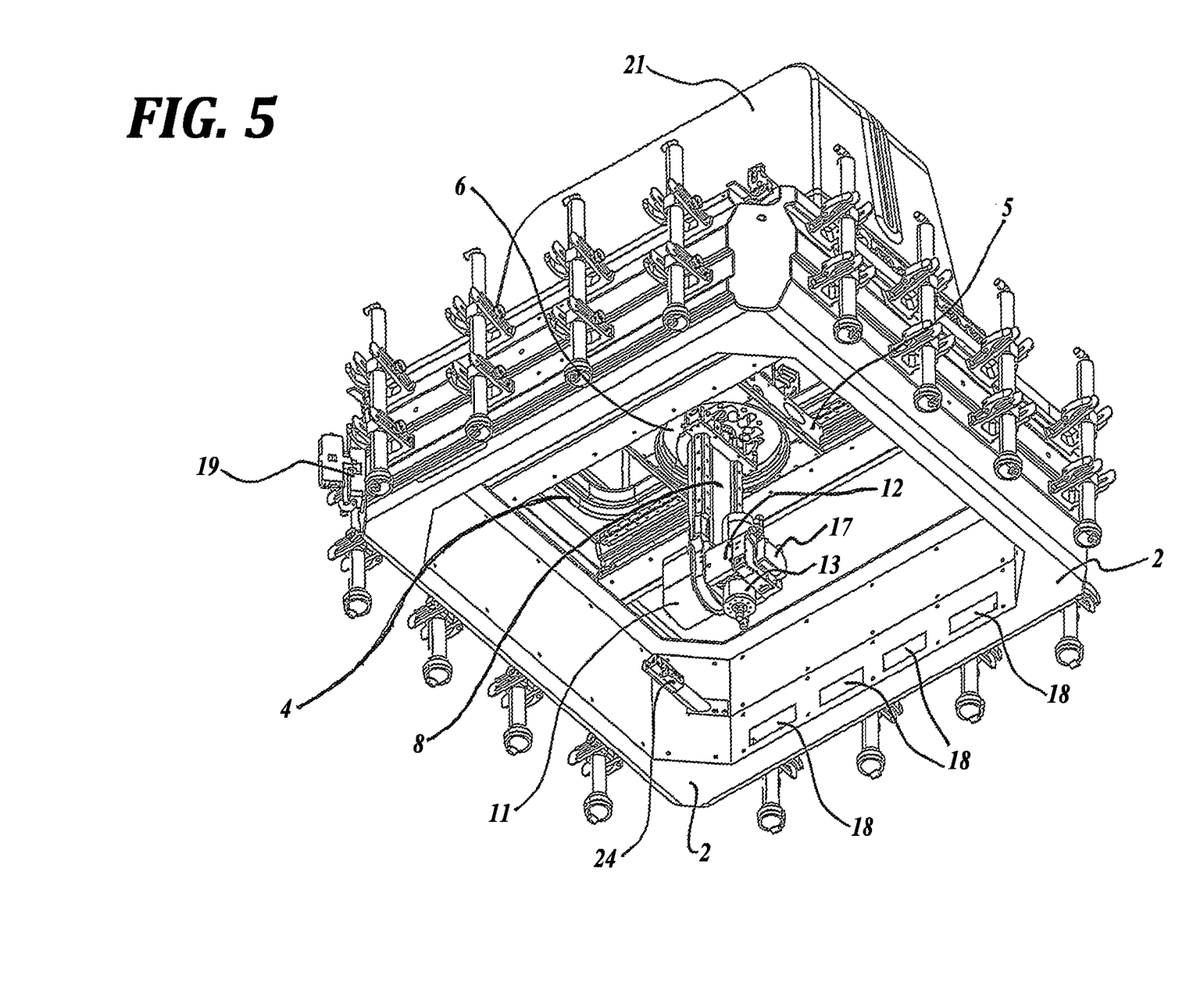
FIG. 5 is a schematic perspective view of the machine tool according to an embodiment of the present invention, viewed obliquely from below.
Figure 6:
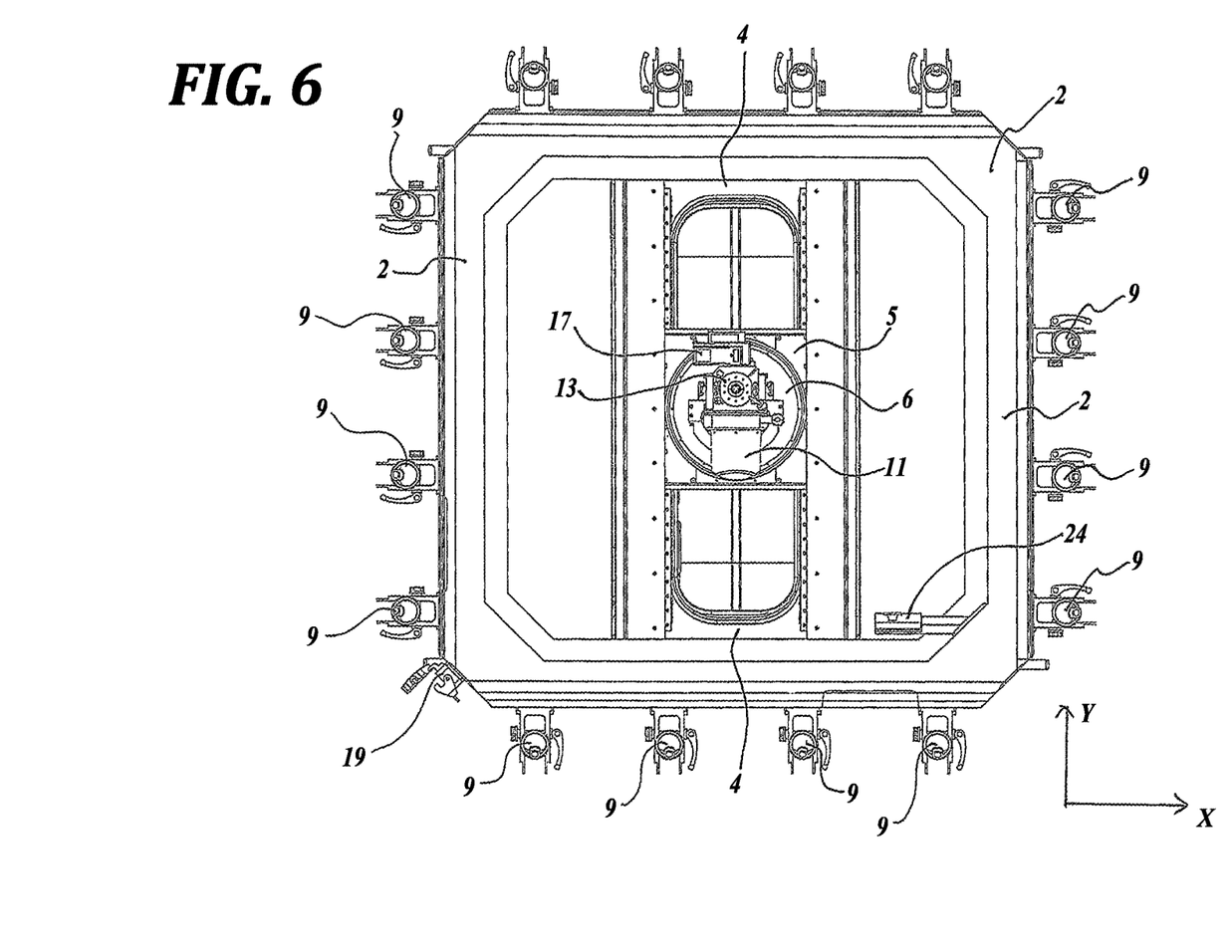
FIG. 6 is a schematic bottom view of the machine tool according to an embodiment of the present invention.

In the interior of the frame element 2, the machine tool 1 has a machining space, which is fully enclosed by the monolithic frame element 2 (see, for example, FIGS. 5 and 6). On two opposite frame sections of the four frame sections of the frame element 2 guides 3a and 3b extending in the X direction for a controllable X linear axis (first linear axis) are disposed directly on the two opposite frame sections of the frame element 2 (see, for example, FIGS. 1, 3 and 4).

A X carriage 4 displaceable in X direction is guided by the guides 3a and 3b. Preferably, the X linear axis includes a respective length measuring system on at least one and preferably on each of two opposing frame sections on each of the guides 3a and 3b, so that the position of the X carriage 4 of the X linear axis can be determined on one and preferably on both sides.

The X-linear axis includes, for example on both sides of the X carriage, a respective screw drive with a respective screw shaft 3c or 3d, respectively. On the screw shafts 3c and 3d drives 3e and 3f are retained, which are mounted or arranged laterally at the X carriage 4. The drives 3e and 3f are configured to displace the X carriage 4 along the screw shafts 3c and 3d in the X direction.

Thus, the X carriage 4 is guided displaceably in the X-direction via control of the X linear axis on the guides 3a and 3b on the frame element 2 of the machine tool frame and comprises a monolithically formed frame element, which, for example, is made of a fibre reinforced plastic, in particular of carbon fibre reinforced plastic.

On the outer sides of the frame element 2 of the frame of the machine tool four leg elements 9 are arranged at each of the four frame sections, respectively. The leg elements are used to set up the machine tool 1 on a surface, such as on a surface of a large workpiece.

In FIGS. 1-5, an example of a cover element 21 (hood element, or cover, optionally made of plastic) is mounted or arranged in the X carriage 4 in order to cover and to protect the underlying components. Furthermore, the cover element 21 results in an insertion protection for operators of the machine tool 1. However, it is also possible to provide embodiments without cover element 21.

Figure 7:
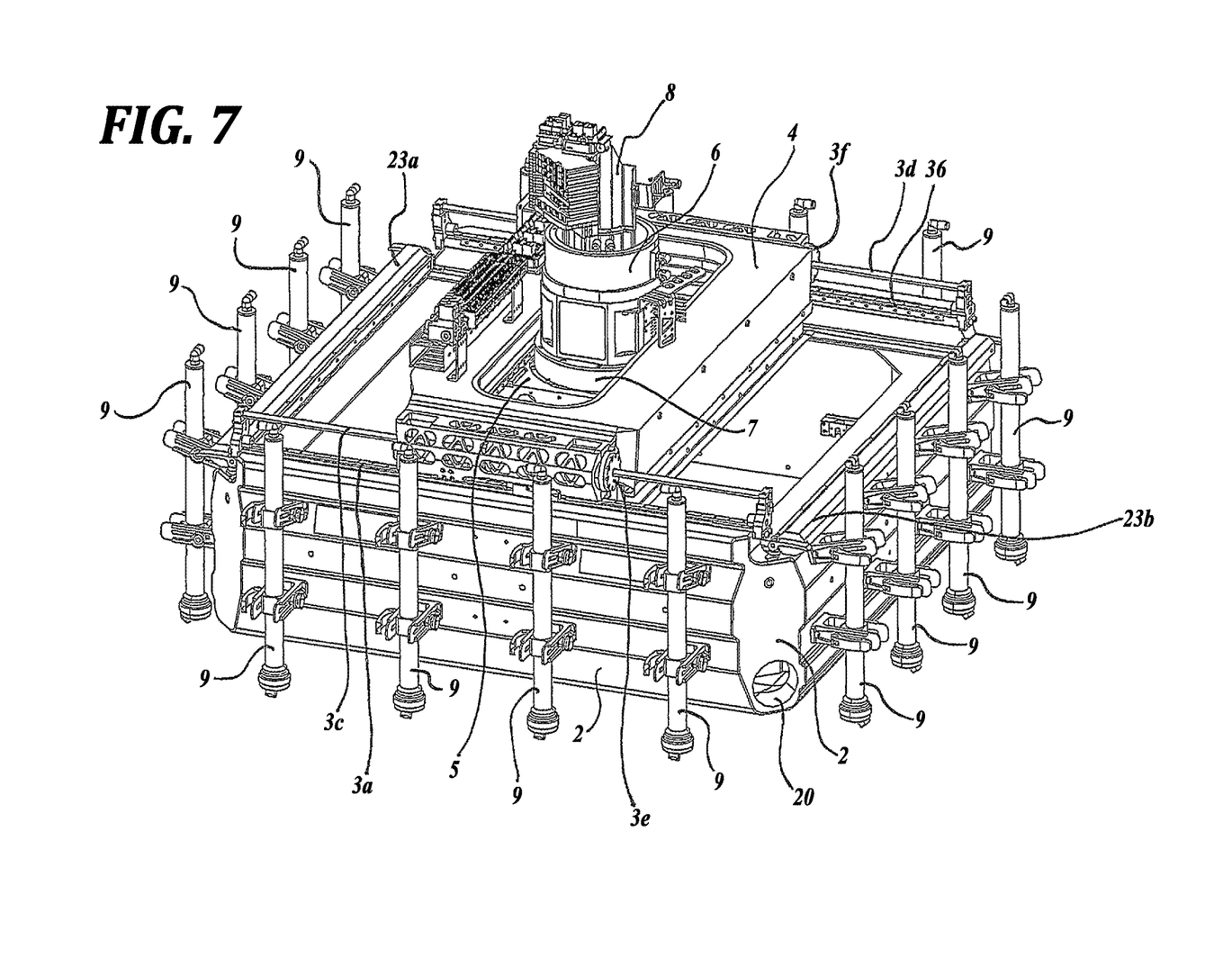
FIG. 7 is a schematic perspective view of a machine tool according to an embodiment of the present invention, viewed obliquely from above without cover element.
Figure 8:
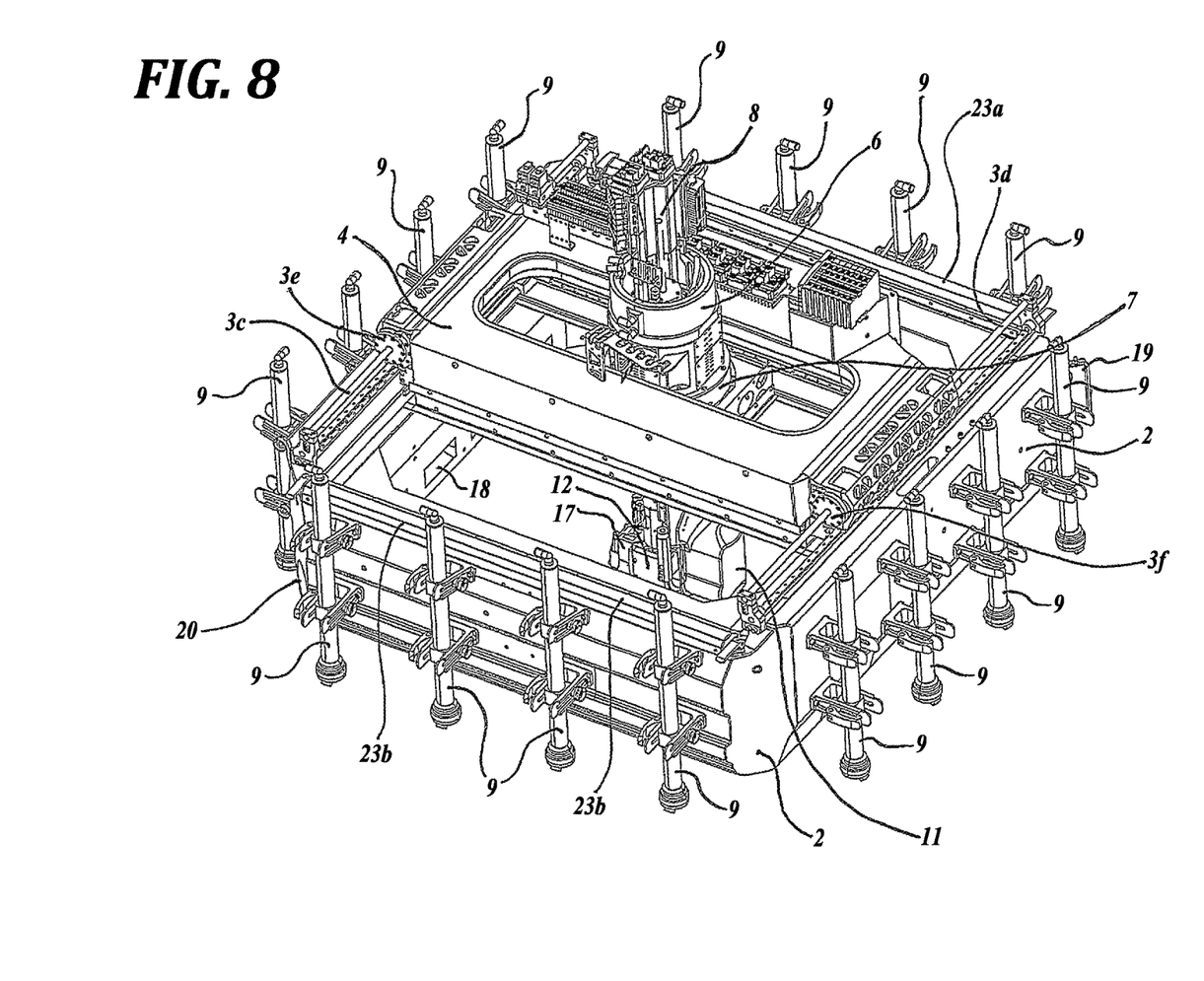
FIG. 8 is another schematic perspective view of a machine tool according to an embodiment of the present invention, viewed obliquely from above without cover element.

FIGS. 6 to 8 show the machine tool 1 without this cover element 21 as an example. FIG. 6 shows a schematic bottom view of the machine tool 1, FIG. 7 shows a schematic perspective view of the machine tool 1, viewed obliquely from above without cover element 21, and FIG. 8 shows a further schematic perspective view of the machine tool 1, viewed obliquely from above without cover element 21.

The frame element of the X carriage 4 includes two cross members 4a and 4b, which extend from the guide 3a on a frame section of the frame element 2 to the opposite frame section of the frame element 2 and the guide 3b. On the bottom of the X carriage 4, a Y carriage 5 of a Y linear axis (second linear axis) is retained, which can be displaced in the Y direction by a drive not shown. For example, the X direction is orthogonal to the Y direction, and the bottom sides of the cross members 4a and 4b of the X carriage 4 have respective guides oriented in the Y direction (not shown), on which the Y carriage 5 of the Y linear axis is guided.

The Y carriage 5 is guided displaceably in the Y-direction by means of the Y linear axis on the guides on the bottom side of the frame element 4 of the X carriage and comprises a monolithically formed frame element, which, for example, is made of a fibre reinforced plastic, in particular a carbon fibre reinforced plastic.

In this preferred embodiment, the X and Y carriages each are formed of a fibre reinforced plastic and comprise a respective frame element of a fibre reinforced plastic. In further embodiments, it is of course possible to form one or both of these carriages or their frame elements from a different material, for example from metal, preferably, for example, from aluminum for weight reasons.

Centrally on the Y-slide 5 of the Y linear axis, a tower element 6 is retained, which extends in a Z direction, which, for example, extends orthogonally to the X and Y directions of the X and Y linear axes. A rotary direct drive 7 is disposed on the Y carriage 5 of the Y linear axis (see, e.g., FIGS. 7 and 8) and is configured to drive the tower element 6 rotationally about a rotation axis (second axis of rotation, preferably controllable over at least 360°), which is oriented in parallel to the Z direction. Inside the, for example hollowed, tower element 6, a Z carriage 8 of a Z linear axis (third linear axis) is arranged (see, for example, FIGS. 5, 7 and 8), which is displaceable in the Z direction by means of another linear drive.

At the lower end of the Z carriage 8, a machining element 12 (machining head, or, e.g., milling head) is arranged, see, e.g., FIGS. 5 and 6. The machining element 12 holds a tool spindle 13 with a tool holder 14 on which of a milling tool 15 for machining a workpiece is received as an example. In the spindle housing of the spindle 13, a spindle motor for driving the spindle is arranged.

In addition, in preferred embodiments of the invention, a piezoelectric actuator or a similar vibration drive is additionally provided in order to additionally drive a vibratory motion in the tool, wherein the tool vibrates in the direction of the spindle axis. This is particularly advantageous in the machining of composite components and surfaces made of fibre composites since fraying or ravelling on the machined surface can be avoided.

The machining element 12 is positioned or retained at the lower end of the Z carriage 8, which projects into the tower element 6, which is rotatable around the Z-axis by means of the rotary direct drive 7, on the Y carriage 5 and is held displaceably in the Z-direction on the tower element 6.

At the lower end of the Z carriage 8, another rotary direct drive 11 is provided by way of example, which is configured to drive the machining element 12 rotationally with the spindle 13 about an axis of rotation (second rotation axis, possibly formed as a pivot axis, preferably controllable over at least 180°), which is, for example, oriented perpendicularly to the Z-direction.

On one side of the machining element 12, as an example, a measuring device 17 is mounted, which may include a laser measurement system for measuring the surface of the workpiece and for determining a position of the machine tool 1 relative to the workpiece and/or other non-contact measurement systems for examining the surface of the workpiece (for example, an optical system with a camera and/or an ultrasonic measuring system). Such a measuring device (or portions of such a measuring device) may also be arranged on the inside of the frame 2.

Furthermore, the machine tool 1 comprises, in further embodiments, preferably a laser tool measurement system or a laser tool measuring device, which can be arranged either on the machining element 2 and/or on the inside of the frame 2, in order to measure a tool 15 received on the spindle 13, or to measure its position, by means of a laser. By way of example, in FIGS. 5 and 6, an optional laser tool measuring device 24 is disposed on the inside of the frame 2. This offers the possibility to measure, e.g., tool length and diameter of the tool 15 received on the spindle 13 by means of the tool laser of the tool measuring device 24 mounted on the frame inside the machine.

An cable feed (not shown) lead from the Y carriage 5 can be connected to the machining element 12, and then provides the electrical power supply for the spindle drive, the direct drive 11, the piezoelectric drive and/or the measuring device 17. Additionally, control signals may be transmitted 11 via the cable feed 16 to the spindle drive and the direct drive and sensor signals may be read out from the measuring device 17.

Further cable guides (e.g., for actuator signals, sensor signals or electrical power supply) are preferably guided in cable ducts, which, in preferred embodiments, are formed on the or in the monolithic frame element 2.

As an example, an interface opening 19 formed externally at a corner of the frame element 2 is shown in FIGS. 1, 3, 5 and 6, as the end of cable guiding ducts formed in the frame element 2 in inward direction or directly or indirectly to one or more of the carriages and the drives at the carriages of the axes.

On the inner surface 2a of the frame element 2 of the machine tool according to this preferred embodiment, suction openings 18 are formed, through which dust and chips can be extracted from the machining space (see, e.g., FIG. 5).

Cable feed ducts and/or suction ducts are preferably formed on and/or in the frame element 2 of the machine tool.

In addition, the machine tool 1 preferably provides outer ports arranged on the frame element 2, for example, the already mentioned control interface 19 for connecting a power connection for electrical power supply and/or for connecting a communication link for the actuator and sensor signal transmission from an external control device, and/or a suction port 20 for an external suction device (if necessary, preferably through a connection over internal suction ducts on or in the frame element 2 to the suction ports 18). Here, the suction ducts or the suction port 20 are/is, in preferred embodiments, connected to the cable feed ducts hydraulically or pneumatically, since, in this way, a negative pressure or vacuum also acts on the cable feed ducts, and protects the electrical components against electrically charged dust.

Figure 9:
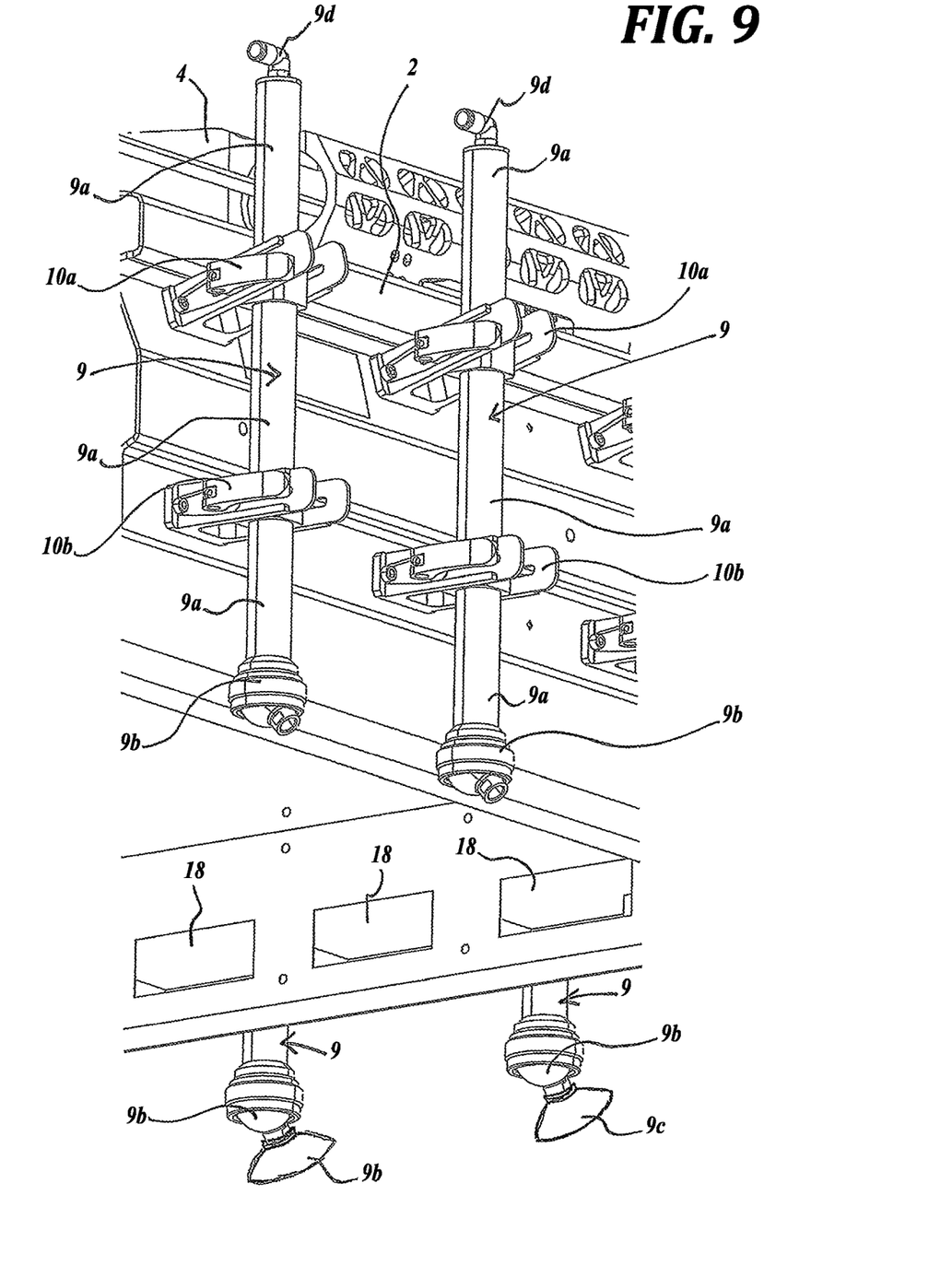
FIG. 9 is an exemplary detailed schematic view of the leg elements according to an embodiment of the present invention.

FIG. 9 shows an exemplary detailed schematic view of the leg elements 9, which are, for example, all of identical design. The leg element includes a hollow rod member 9a, which is preferably formed from a fibre reinforced plastic, in particular a carbon fibre reinforced plastic. The rod member 9a is fixed to the outside of the frame element 2 of the frame of the machine tool 1 by means of fastening elements 10a and 10b. In this embodiment, quick-release mechanisms are provided at the fastening elements 10a and 10b in order to adjust the angle and height of the leg elements 9 individually.

At the upper end of the rod member 9a, a port or medium port 9d is mounted, and at the lower end of the rod member 9a, a ball joint 9b is mounted, to which a suction cup port 9c is attached. Via a medium duct in the interior of the ball element of the ball joint 9b and via a medium duct in the interior of the rod member 9a, the suction cup port 9c can be controlled by, for example, applying a negative pressure inside the medium duct by connecting a hydraulic and/or pneumatic system, for example, by tube connection to the medium port 9d.

The ball joint 9b allows pivoting the suction cup 9c to adjust the inclination of the suction cup 9c on an uneven surface of the workpiece to be machined on which the machine tool 1 is attached by means of leg elements.

Furthermore, in other embodiments the rod members 9, may be adjustable in height, for example, by means of a structure according to a telescopic principle (e.g., a telescopic rod) in order to adjust the height position of the suction cups 9c on the uneven surface of the workpiece to be machined. Thus, advantageously the position and/or inclination of each suction cup 9c are individually adjustable.

In preferred embodiments, it is possible to connect the medium ports 9d of the leg elements via pneumatic connections (e.g., via tube connections) to openings at the frame element 2, which are in turn connected to the suction port 20, for example through ducts and/or inner tube components formed at or in the frame element 2. This advantageously enables the generation of the negative pressure or vacuum for the suction cups 9c by ejectors in the frame of the machine.

In particularly preferred embodiments, a single external suction device (e.g., a vacuum pump or the like) is connected to the suction port 20 formed on the outer side of the frame element 2, wherein the suction port is connected via ducts formed on or in the frame element to the intake ports 18 on the inside of the frame 2, respectively, in order to extract dust and chips from the machining space, and to openings on the outer side of the frame element, at which connections are connected, that are in turn connected to the medium ports 9d in order to control the suction cups 9b or to apply negative pressure or vacuum from the inside of the suction cups 9b.

In the embodiment according to FIGS. 1-8, optionally cases 23a and 23b, in which the roller cover elements may be stored in a rolled up state, are arranged on the frame sections of the frame 2, which are oriented perpendicularly to the X-axis.

Ends or end portions of such roller cover elements may, in further embodiments, be mounted on the sides of the X carriage 4 so that, upon movement of the X carriage 4 on a side, from which the X carriage 4 is moving away, they are pulled out of the respective housing, and/or on a side, towards which the X carriage 4 is moving, to be pulled into the respective housing. Optionally, this results in covering the machining space from above.

Such roller cover elements are preferably made of transparent material. Preferably, the frame sections of the frame 2, at which the guides 3a and 3b are arranged further include lateral guides for the roller cover elements, which extend in parallel to the X-axis, with the housings 23a and 23b and the roller cover elements preferably oriented perpendicularly to the X axis.

In further preferred embodiments, at one of the machine tools described above, one or more video recording devices may be arranged on the frame of the machine tool (for example, the above-mentioned camera for the visual inspection of the surface of the workpiece, which may be optionally attached to the machining unit, and/or one or more cameras, for example on the frame, for monitoring the machining element, a portion of the machining space or the entire machining space, which is formed inside the frame element).

Preferably, the one or more video recording devices each comprise one or more fixed cameras, which are preferably directed towards the machining element and/or preferably directed at least towards a portion of a machining space formed by the frame of the machine tool. This advantageously enables an operator to monitor the machining in the machining space of the machine tool, possibly via an external display of a display device, which may be connected to the video recording devices via a cable connection and/or via a wireless communication link.

Alternatively or additionally, the one or more video recording devices each preferably include one or more controllable cameras, which are preferably directable towards the machining element and/or at least a portion of a machining space formed by the frame of the machine tool. This advantageously enables an operator to monitor the machining in the machining space of the machine tool, possibly via an external display of a display device which may be connected to the video recording device(s) via a cable connection and/or via a wireless communication link, and also to control the orientation of the cameras movably or optionally (or alternatively, for example, in the above-mentioned fixed cameras) to control a zoom level electronically.

Preferably, the one or more video recording devices are connected by means of a power and/or signal line to a power and/or control interface of the machine tool, via which the video recording devices are preferably connectable to an external display device to output video signals, preferably for displaying video images on a display of the external display device, and/or are connectable to a control device, via which an operator of the machine tool can control the one or more video recording devices.

In further preferred embodiments, in one of the machine tools described above, one or more electric light sources may be formed, in particular as LED units with a plurality of LEDs and/or as a flood light, preferably for illuminating a machining space formed by the frame of the machine tool.

In further exemplary modifications of the aforementioned embodiment, the aforementioned aspects may be provided separately and in various combinations. Possibly combinable aspects and possible independent aspects arise in particular, but not exclusively, from the summary of the invention before the description of the figures and from the following independent and dependent claims.

In summary, in accordance with aspects and preferred embodiments of the invention, machine tools are proposed that can, at significant weight saving, advantageously be used in mobile applications for machining large-sized components and workpieces, wherein the stiffness of the machine can be increased and the machining accuracy can be improved at enhanced practicality and with a wider possible range of applications.

All this advantageously allows the use of the mobile machine tool according to one or more of the above aspects for automated repair of large composite parts or fibre reinforced plastic components such as in the aerospace and automotive industries.

The invention claimed is:

1. A machine tool, comprising:
   a frame with two opposite frame sections,
   a plurality of leg elements arranged on said frame,
   a first carriage of a first linear axis, which is guided on said two opposite frame sections of said frame and is displaceable in a first direction,
   a second carriage of a second linear axis, which is guided on said first carriage and is displaceable in a second direction,
   a tower element of a third linear axis, which is retained on said second carriage,
   a machining element which is retained on said tower element directly or indirectly and is displaceable in a third direction, and
   a tool spindle arranged on said machining element and configured to receive a tool;
   wherein said frame includes a monolithic frame element which comprises said two opposite frame sections, and which is made of a fibre reinforced plastic.

2. The machine tool according to claim 1, wherein said machine tool further comprises a first rotational axis, which is configured to rotate said machining element about a first axis of rotation, and/or a second rotational axis, which is configured to rotate said machining element about a second axis of rotation arranged transversely or perpendicularly to said first axis of rotation.

3. The machine tool according to claim 1, wherein said first carriage includes two opposite cross members, which extend from one of said two opposite frame sections to the other of said two opposite frame sections of said frame,
   wherein guiding elements for guiding said second carriage of said second linear axis are arranged on said two opposite cross members of said first carriage.

4. The machine tool according to claim 3, wherein said guiding elements for guiding said second carriage of said second linear axis are arranged on said two opposite cross members of said first carriage on a side of said first carriage, on which said first carriage is guided on said two opposite frame sections of said frame, such that said second carriage and said frame of said machine tool are arranged on a same side of said first carriage;
   a monolithic frame element of said first carriage comprises said two opposite cross members of said first carriage; and/or
   said guiding elements for guiding said second carriage of said second linear axis are mounted and/or fixed directly on said two opposite cross members of said first carriage; and/or
   said tower element is arranged between said two opposite cross members of said first carriage.

5. The machine tool according to claim 1, wherein said first carriage includes a monolithic frame element made of a fibre reinforced plastic or a metal, and/or said second carriage includes a monolithic frame element made of a fibre reinforced plastic or a metal.

6. The machine tool according to claim 1, wherein said second carriage includes two opposite cross members, wherein said tower element is arranged between said two opposite cross members of said second carriage.

7. The machine tool according to claim 1, wherein said tower element is supported rotatably on said second carriage, and a direct drive of said first rotation axis is arranged on said second carriage, which drives said tower element rotationally.

8. The machine tool according to claim 1, wherein said machining element includes an actuator which is configured to drive a vibratory movement of a tool held on said tool spindle in the direction of the spindle axis; and said actuator includes a piezoelectric drive which is configured to drive said vibratory movement of a tool held on said tool spindle in the direction of the spindle axis.

9. The machine tool according to claim 1, wherein said machine tool further comprises a suction means for extracting dust and machining chips from a machining space arranged in the interior of said frame, wherein said frame comprises one or more suction openings, which face the interior of said frame, wherein one or more suction ducts, which are connected to the one or more suction openings, are formed on or in said monolithic frame element; and at least one suction port, which is connected to said suction ducts, is mounted or formed on said monolithic frame element for connecting an external suction device.

10. The machine tool according claim 1, wherein said two opposite frame sections of said frame include guides for one or more roller cover elements movable in the first direction for covering the interior of said frame, and end portions of said movable roller cover elements are mounted on said first carriage such that displacing said first carriage moves said movable roller cover elements.

11. The machine tool according to claim 1, wherein said plurality of leg elements arranged on said frame include a respective suction cup connection for attachment to the surface of a workpiece to be machined; and said plurality of leg elements arranged on said frame include a respective hollow element, which, at one end, is connected to said respective suction cup connection, and/or, at another end, is connected to a medium port.

12. The machine tool according to claim 1, wherein one or more of said plurality of leg elements arranged on said frame include a respective ball joint.

13. The machine tool according to claim 1, wherein said plurality of leg elements arranged on said frame are adjustable in height.

14. The machine tool according to claim 1, wherein said machine tool further comprises a control interface for connecting an external control device for controlling said machine tool, said control interface is arranged on said frame and includes an external power interface for supplying said machine with electrical power and/or an external communication interface for receiving external control signals from said external control device, and said machine tool further comprises one or more drive controllers for controlling a respective drive of a controllable axis of said machine tool, each of said drive controllers being connected to said communication interface of said control interface, each of said drive controllers being connected to said power interface of said control interface.

15. The machine tool according to claim 14, wherein said machine tool further comprises one or more drives configured to drive a respective controllable axis of said machine tool, each of said drives being connected to said power interface of said control interface.

16. The machine tool according to claim 14, wherein one or more cable guiding ducts are formed on or in said monolithic frame element of said frame, wherein said cable guiding ducts are connected to an opening for said control interface, which is formed on or in said frame element.

17. The machine tool according to claim 1, wherein said machine tool further comprises a cover element, which is arranged at said first carriage and covers said first carriage, and said cover element covers said second carriage, which is arranged on said first carriage, and/or said tower element.

18. The machine tool according to claim 1, wherein Said machine tool further comprises a tool measuring device arranged on the inside of said frame of said machine tool for measuring a tool received on said tool spindle.

19. The machine tool according to claim 1, wherein one or more video recording devices are arranged on said frame of said machine tool; and said one or more video recording devices each comprise one or more fixed cameras, which are directed towards said machining element and/or directed at least towards a portion of a machining space formed by said frame of said machine tool; and/or said one or more video recording devices each include one or more controllable cameras, which are directable towards said machining element and/or at least towards a portion of a machining space formed by said frame of said machine tool.

20. The machine tool according claim 1, wherein one or more electric light sources are formed for illuminating a machining space formed by said frame of said machine tool.

21. The machine tool according to claim 1, wherein the fibre reinforced plastic is a carbon-fibre reinforced plastic.

* * * * *